United States Patent
Lee et al.

(10) Patent No.: US 8,265,789 B2
(45) Date of Patent: Sep. 11, 2012

(54) NETWORK-BASED ROBOT SYSTEM AND METHOD FOR ACTION EXECUTION OF ROBOT

(75) Inventors: Seung-Ik Lee, Daejeon (KR); Sung Hoon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 887 days.

(21) Appl. No.: 12/326,618

(22) Filed: Dec. 2, 2008

(65) Prior Publication Data
US 2009/0143909 A1 Jun. 4, 2009

(30) Foreign Application Priority Data

Dec. 3, 2007 (KR) .................... 10-2007-0124162
Jun. 11, 2008 (KR) .................... 10-2008-0054685

(51) Int. Cl.
*G06F 19/00* (2006.01)

(52) U.S. Cl. ........ 700/245; 700/250; 700/259; 700/264; 318/567; 318/568.11; 318/568.1; 901/50

(58) Field of Classification Search .......... 700/245, 700/254, 250, 259, 264; 901/50; 318/567, 318/568.1, 568.11
See application file for complete search history.

(56) References Cited

U.S. PATENT DOCUMENTS

| | | | | |
|---|---|---|---|---|
| 5,327,541 A | * | 7/1994 | Reinecke et al. | 711/217 |
| 5,442,784 A | * | 8/1995 | Powers et al. | 1/1 |
| 5,598,545 A | * | 1/1997 | Childers et al. | 712/221 |
| 5,659,727 A | * | 8/1997 | Velissaropoulos et al. | 1/1 |
| 5,664,181 A | * | 9/1997 | Velissaropoulos et al. | 1/1 |
| 5,749,080 A | * | 5/1998 | Matsumoto et al. | 1/1 |
| 5,864,858 A | * | 1/1999 | Matsumoto et al. | 1/1 |
| 5,924,094 A | * | 7/1999 | Sutter | 1/1 |
| 6,321,231 B1 | * | 11/2001 | Jebens et al. | 1/1 |
| 6,378,627 B1 | * | 4/2002 | Tubel et al. | 175/24 |
| 6,450,104 B1 | * | 9/2002 | Grant et al. | 104/138.2 |
| 6,535,793 B2 | * | 3/2003 | Allard | 700/259 |
| 6,622,137 B1 | * | 9/2003 | Ravid et al. | 706/47 |
| 6,845,297 B2 | * | 1/2005 | Allard | 700/259 |
| 6,879,862 B2 | * | 4/2005 | Brown et al. | 700/17 |
| 6,879,878 B2 | * | 4/2005 | Glenn et al. | 700/245 |
| 7,031,802 B2 | * | 4/2006 | Bash et al. | 700/214 |
| 7,069,111 B2 | * | 6/2006 | Glenn et al. | 700/245 |
| 7,197,502 B2 | * | 3/2007 | Feinsmith | 1/1 |
| 7,211,980 B1 | * | 5/2007 | Bruemmer e | 318/587 |

(Continued)

FOREIGN PATENT DOCUMENTS

JP 2004-114242 4/2004

(Continued)

OTHER PUBLICATIONS

Korean Office Action issued on May 3, 2010 in corresponding Korean Patent Application 10-2008-0054685.

*Primary Examiner* — Thomas G. Black
*Assistant Examiner* — Wae Louie
(74) *Attorney, Agent, or Firm* — Staas & Halsey LLP

(57) ABSTRACT

A network-based robot system includes an activity creating device creating activities in hierarchical structure, and a robot downloading the activity tree over a communication network and executing an activity selected in the activity tree. The activities describe action execution procedures to be run by the robot and are arranged in an activity tree.

14 Claims, 6 Drawing Sheets

U.S. PATENT DOCUMENTS

| | | | | |
|---|---|---|---|---|
| 7,272,818 B2* | 9/2007 | Ishimitsu et al. | | 717/108 |
| 7,296,023 B2* | 11/2007 | Geyer et al. | | 1/1 |
| 7,332,890 B2* | 2/2008 | Cohen et al. | | 320/109 |
| 7,487,160 B2* | 2/2009 | Whyte | | 1/1 |
| 7,650,205 B2* | 1/2010 | Calcagno | | 700/264 |
| 7,792,886 B2* | 9/2010 | Hadari et al. | | 707/790 |
| 7,813,816 B2* | 10/2010 | Fulton et al. | | 700/11 |
| 7,853,357 B2* | 12/2010 | Sawada et al. | | 700/250 |
| 7,926,438 B2* | 4/2011 | Guerrero et al. | | 114/312 |
| 2005/0033822 A1* | 2/2005 | Grayson et al. | | 709/217 |
| 2005/0165859 A1* | 7/2005 | Geyer et al. | | 707/201 |
| 2006/0271351 A1* | 11/2006 | Mirkovic et al. | | 704/4 |
| 2008/0162551 A1* | 7/2008 | Geyer et al. | | 707/103 R |
| 2009/0143909 A1* | 6/2009 | Lee et al. | | 700/245 |

FOREIGN PATENT DOCUMENTS

| | | |
|---|---|---|
| JP | 2005-246591 | 9/2005 |
| KR | 10-2004-0098498 | 11/2004 |
| KR | 10-2007-0004268 | 1/2007 |

* cited by examiner

NETWORK-BASED ROBOT SYSTEM AND METHOD FOR ACTION EXECUTION OF ROBOT

CROSS-REFERENCE(S) TO RELATED APPLICATION(S)

The present application claims priority of Korean Patent Applications No. 10-2007-0124162 and 10-2008-0054685, filed on Dec. 3, 2007 and Jun. 11, 2008, which are incorporated herein by reference.

FIELD OF THE INVENTION

The present invention relates to a network-based robot system, and more specifically, to a network-based robot system and method for action execution of a robot in the network-based robot system to enable hierarchical/concurrent/sequential action execution of the robot.

This work was supported by the IT R&D program of MIC/IITA [2005-S-033-03, Action execution sequence model, method and devices for hierarchical, concurrent action execution].

BACKGROUND OF THE INVENTION

In general, robot actions that are executed in a robot follow a certain order, and a description on the order of action execution is called an action execution procedure. That is, an action execution procedure of a robot is basically constituted by a condition decision step for processing information on an external condition, an action decision step for deciding an action to be carried out by the robot based on the external condition, and an action execution step for carrying out the decided action. These steps are implemented in software and used in a robot control algorithm.

As conventional techniques related to the above action execution procedure, there are two ways: one is associated with the kind of languages to describe the action decision process and the other is associated with a model used as a basis of the action decision process.

The former way is to implement the action decision process directly in a compiler source code such as C language or C++ language. The action decision process implemented in the source code is combined with the condition decision process and the action execution process, followed by being compiled to create an execution program. The execution program so created is then loaded in a robot and used to control the robot. The major advantage of this way is that action decision process is executed quickly because the action decision process is mapped to an execution code.

Meanwhile, the latter way makes use of a sequential/planar model to sequentially describe a series of actions in temporal order.

However, the former way has a difficulty in revising the action decision process, a difficulty in immediate revision and debugging, and a difficulty in learning.

The latter way has a shortcoming in poor modulation of the action selection process, poor reusability, and increasing complexity and a difficulty in modulation of an excessively enlarged planar model as the action selection process gets more complex.

In addition, these conventional approaches are convenient to describe a decision that is made for sequential actions, but are not suitable for describing actions that are executed in parallel.

SUMMARY OF THE INVENTION

It is, therefore, an object of the present invention to provide a network-based robot system and method for action execution of a robot in the network-based robot system to enable hierarchical/concurrent/sequential action execution of the robot by creating an activity to define hierarchical/parallel/sequential action execution procedures of the robot and distributing the created action execution procedures to the robot.

In accordance with an aspect of the present invention, there is provided a network-based robot system comprising:

an activity creating device creating activities in hierarchical structure, each activity describing action execution procedures to be carried out and being arranged in an activity tree;

a robot downloading the activity tree over a communication network and executing an activity selected in the activity tree.

In accordance with another aspect of the present invention, there is provided a method for action execution of a robot in a network-based robot system, comprising:

creating activities in hierarchical structure, each activity describing action execution procedures to be run by the robot and being arranged in an activity tree;

downloading the activity tree via communication network to storing the activity tree in the robot;

searching for, in response an execution instruction of the robot, the activity tree including a target activity corresponding to the execution instruction;

interpreting the searched activity tree; and executing the target activity in the interpreted activity tree.

BRIEF DESCRIPTION OF THE DRAWINGS

The above and other objects and features of the present invention will become apparent from the following description of embodiments, given in conjunction with the accompanying drawings, in which.

DETAILED DESCRIPTION OF THE EMBODIMENTS

Hereinafter, various embodiments of the present invention will be described in detail with reference to the accompanying drawings. In the following description, well-known constitutions or functions will not be described in detail if they would obscure the invention in unnecessary detail.

Figure 1:
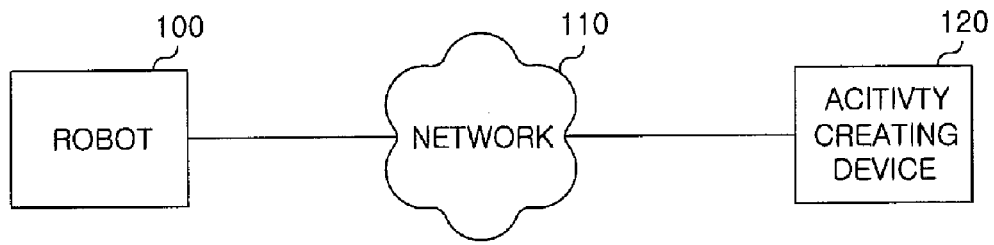
FIG. 1 shows a schematic view of a network-based robot system in accordance with the present invention.

FIG. 1 shows a schematic view of a network-based robot system in accordance with the present invention.

A network-based robot system of the present invention includes a robot 100 and an activity creating device 120 which are connected over a communication network 110.

The activity creating device 120 creates activities to be executed in the robot 100 in hierarchical structure. An activity is a basic unit in script format defining the action execution procedures of the robot 100 to be run within a certain period of time, more details of which will be given with reference to FIG. 3.

The activity creating device 120 has a function of structural/hierarchical edition to efficiently express the activities that have structural/hierarchical/sequential attributes. The activity creating device 120 provides an interface for describing a basic action execution procedure of the robot 100, and an interface for describing a complex action execution procedure higher level of the basic action execution procedure, thereby enabling a robot programmer to achieve an activity with a hierarchical tree structure. The activities created by the activity creating device 120 are downloaded in the robot 100 through the communication network 110, which may include wired/wireless communication networks.

The robot 100 manages the downloaded activities and performs actions corresponding to the activities.

Figure 2:
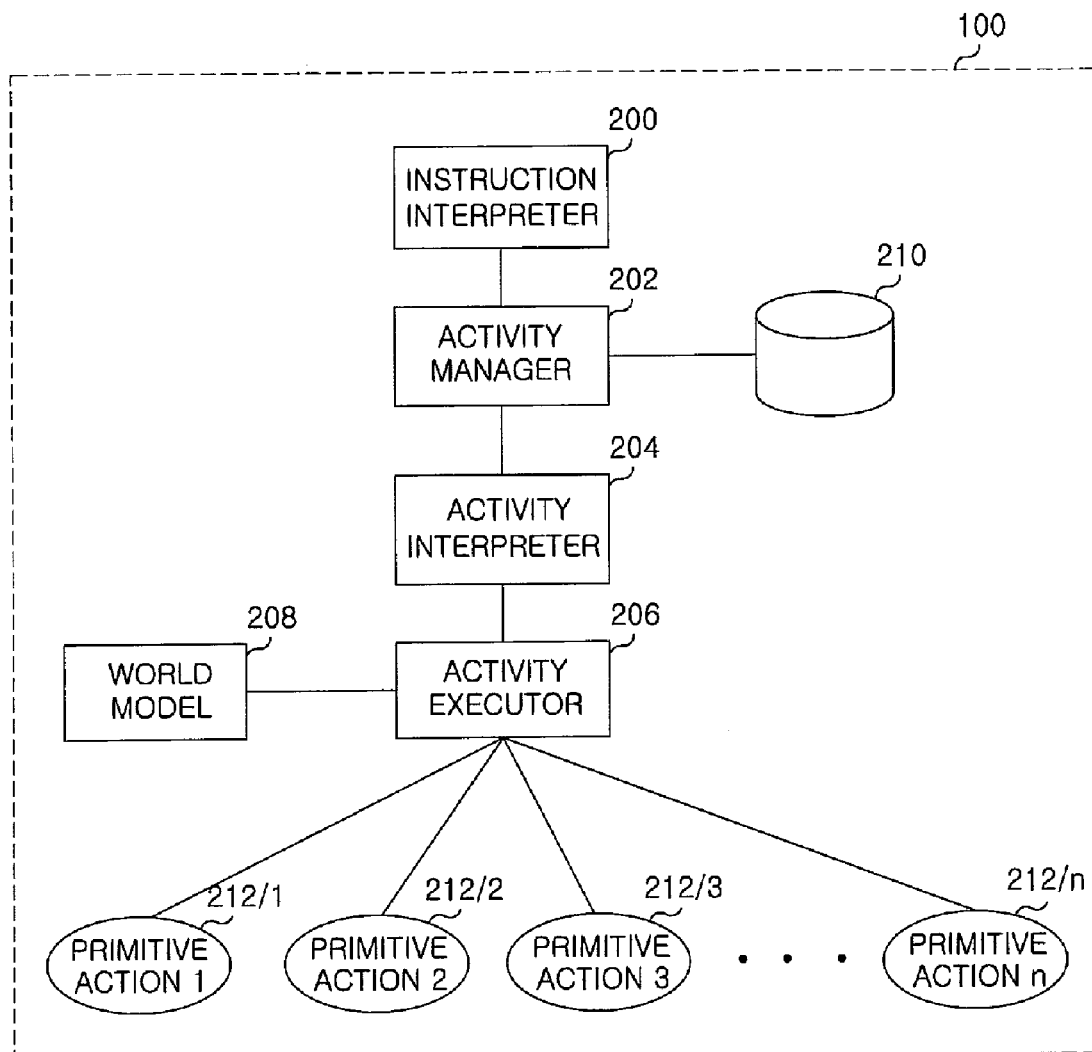
FIG. 2 illustrates a block diagram of an apparatus for action execution in the robot shown in FIG. 1.

FIG. 2 illustrates a block diagram of an action execution apparatus in the robot 100 shown in FIG. 1, which includes an instruction interpreter 200, an activity manager 202, an activity interpreter 204, an activity executor 206, a world model 208, an activity storage 210, and a plurality of primitive actions 212/a to 212/n to be taken by the robot 100.

The activity storage 210 stores activities in a tree structure that are provided from the activity creating device 120.

The instruction interpreter 200 interprets a user-input execution instruction for the robot 100 to know which activity needs to be executed.

The activity manager 202 allows the activities to be downloaded over the communication network 110, and them to be stored in a form of activity trees in the activity storage 210. Further, the activity manager 202 searches the activity storage 210 for an activity tree having an activity that is associated with the execution instruction interpreted from the instruction interpreter 200. The searched activity tree is then provided to the activity interpreter 204.

The activity interpreter 204 interprets the activity tree in script format, and changes it in a format readable by the activity executor 206 and loads the same onto a memory device (not shown).

The activity executor 206 is responsible for actual execution of an activity, and when the activity is executed, it changes an internal mode of the activity through a mode transition decision routine of the activity. At this time, the mode transition decision routine checks surrounding conditions of the robot 100 that is recorded in the world model 208 to determine whether to transit the mode.

The world model 208 is a collection of data that represents surrounding conditions of the robot 100. Information on the surrounding conditions sensed by all kinds of built-in sensors (not shown) mounted in the robot 100 is processed in a format required for the activity, and is recorded on the world model 208. Since the surrounding conditions of the robot 100 continuously change, the surrounding conditions are acquired by the built-in sensors on regular cycle and recorded on the world model 208 after processing thereof.

Figure 3:
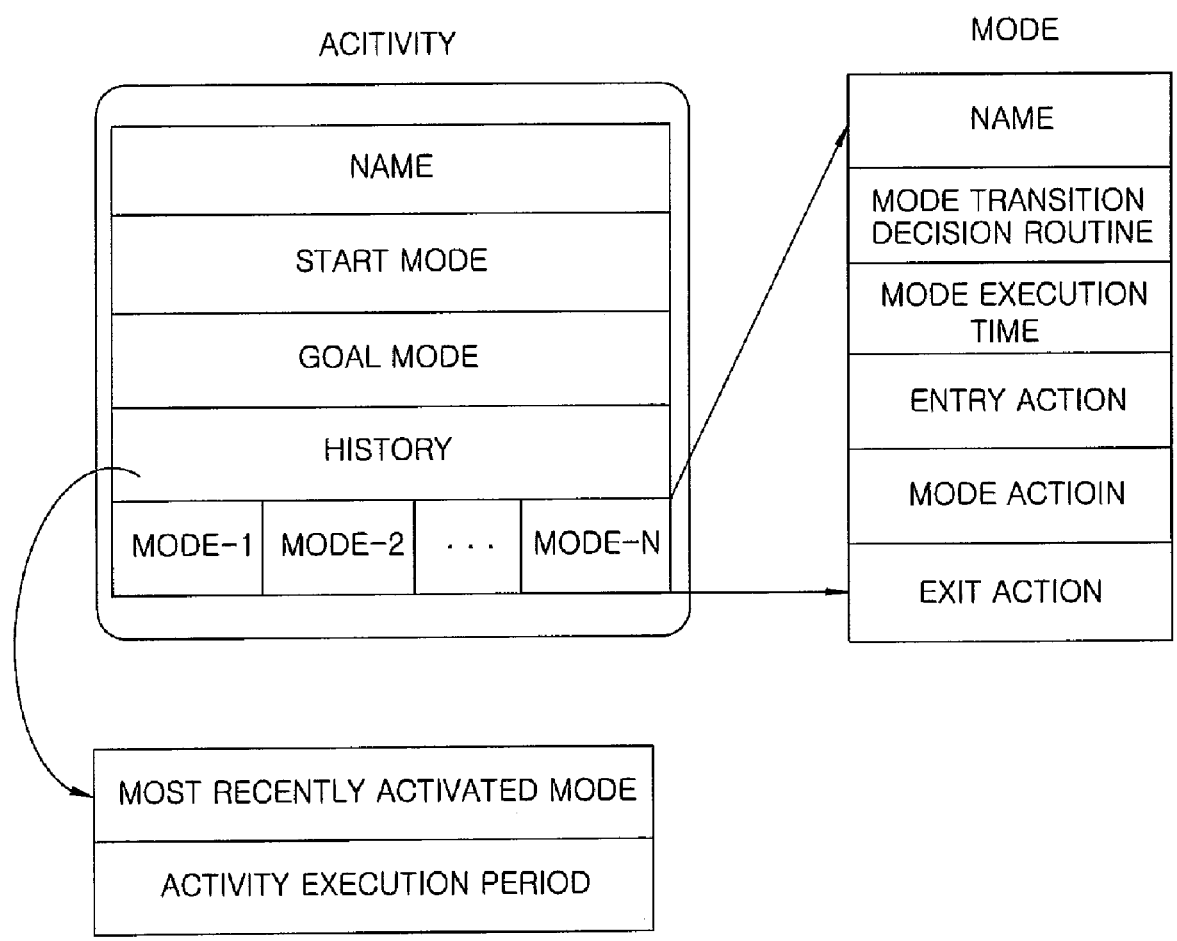
FIG. 3 shows the structure of an activity created in the activity creating device.

FIG. 3 shows the structure of an activity created in the activity creating device 120.

An activity, as shown in FIG. 3, can have plural modes internally, and depending on which mode the activity is in at a certain moment, an action to be executed by the robot 100 is determined. In the activity, a name indicates the name of the activity. Start mode is only one among plural modes of the activity. If the activity has never been run before, execution of the activity begins in this start mode. However, if the activity has been run before, then its record will be in the activity history. If the record of previous executions in the history shows that the previous execution of the activity had been finished in the other mode, not in start mode, during the previous execution, the execution of the activity is newly done in the other mode.

Goal mode is composed of one or more modes among plural modes of the activity. The goal mode is reached when the activity has finished a certain goal it has pursued. When the execution of the activity reaches a relevant goal mode, the activity is regarded as having achieved its expected goal. Such goal mode can be used for a higher activity to examine whether an activity that is called out from the higher activity has successfully finished a goal.

The activity history retains an execution record of an activity while the activity is being executed. Such an execution record contains information about activated time of the activity in a previous execution cycle (0 is set if not activated) and information about the mode that is finally activated in the previous execution cycle.

Each mode has a structure containing a name indicative of the mode, mode execution time, entry action to be performed when newly entering a mode, exit action to be performed when exiting a mode, mode action to be performed while in a mode, and a mode transition decision routine for deciding whether a mode needs to transit to the other mode (or this current mode).

Figure 4:
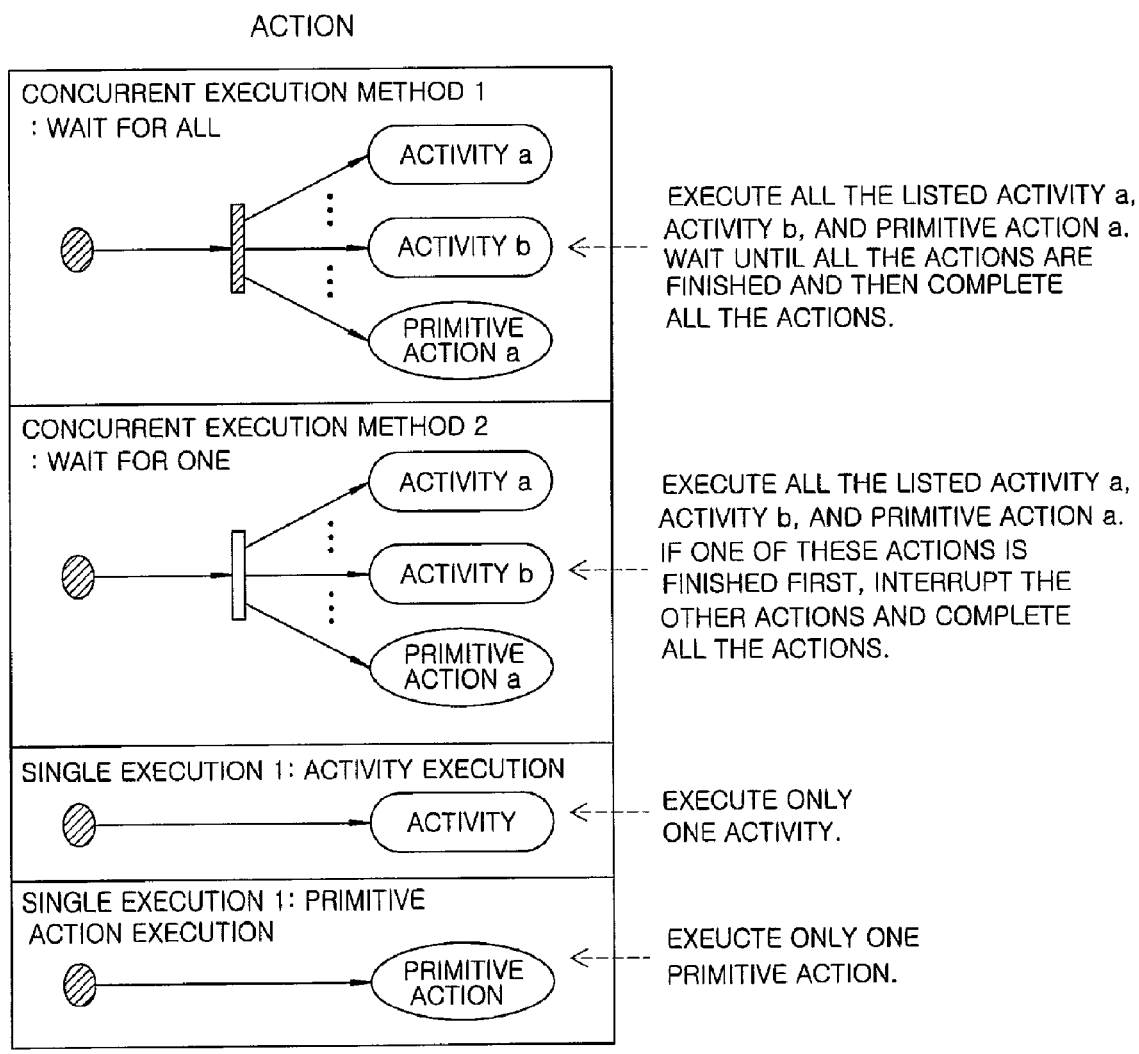
FIG. 4 is an illustrative diagram showing a description method of robot actions to be executed in an entry action, mode action, or exit action in an activity.

With reference to FIG. 4, a description method of robot actions to be executed in each of the entry action, mode action and exit action in the activity will now be explained.

Referring to FIG. 4, a robot can execute a number of actions (activity or primitive actions) at the same time, or can execute one single action (activity or primitive action) There are two ways for a robot to execute many actions concurrently. One way is to complete the entire action only after a number of actions that were executed at the same time are all finished. For example, suppose that a robot intends to execute a dance action to the music. Once the robot starts playing music and dancing to the music concurrently, the entire action will not be completed until the music stops playing and then the dance action is ended. The other way is to set priorities in actions that are executed at the same time. That is, with respect to an action which is finished first, the other actions being still under execution are interrupted. For example, suppose that a robot is now dancing to the music. In this case, if the playing music action has ended, the dance action, although it is still under execution, is interrupted and the entire action is regarded as being completed.

On the other hand, when a robot executes one single action, an activity or primitive action becomes the action of the robot. Such an activity can be expressed in script format as illustrated in TABLE 1 that is an illustrative diagram showing an activity written in script language.

TABLE 1

```
activity a1 {
    mode [start] M1 {
        entry_action {
            do_initialize;
        }
        transition_rule {
            if (something>1)
```

TABLE 1-continued

```
      transition_to(M2);
    else
      no_transition;
  }
  do {
    concurrent_run_and_exit_when_all_finishes(a2, a3);
  }
  exit_action {
    do_cleanup;
  }
}
mode [goal] M2
{
  transition_rule {
    if (something2>2)
      transition_to(M1);
    else
      no_transition;
  }
  do {
    run_activity (a2);
  }
 }
}
```

Referring to TABLE 1, if an activity a1 is defined, the activity a1 has two internal modes M1 and M2. Here, M1 indicates a start mode of the activity a1, and M2 indicates a goal mode of the activity a1. The mode M1 specifies an entry action entry_action, mode transition decision routine transition_rule, mode action do{ ... }, and exit action exit_action. The mode M2 does not specify the entry action and the exit action, but specifies only the mode transition decision routine and the mode action.

Figure 5:
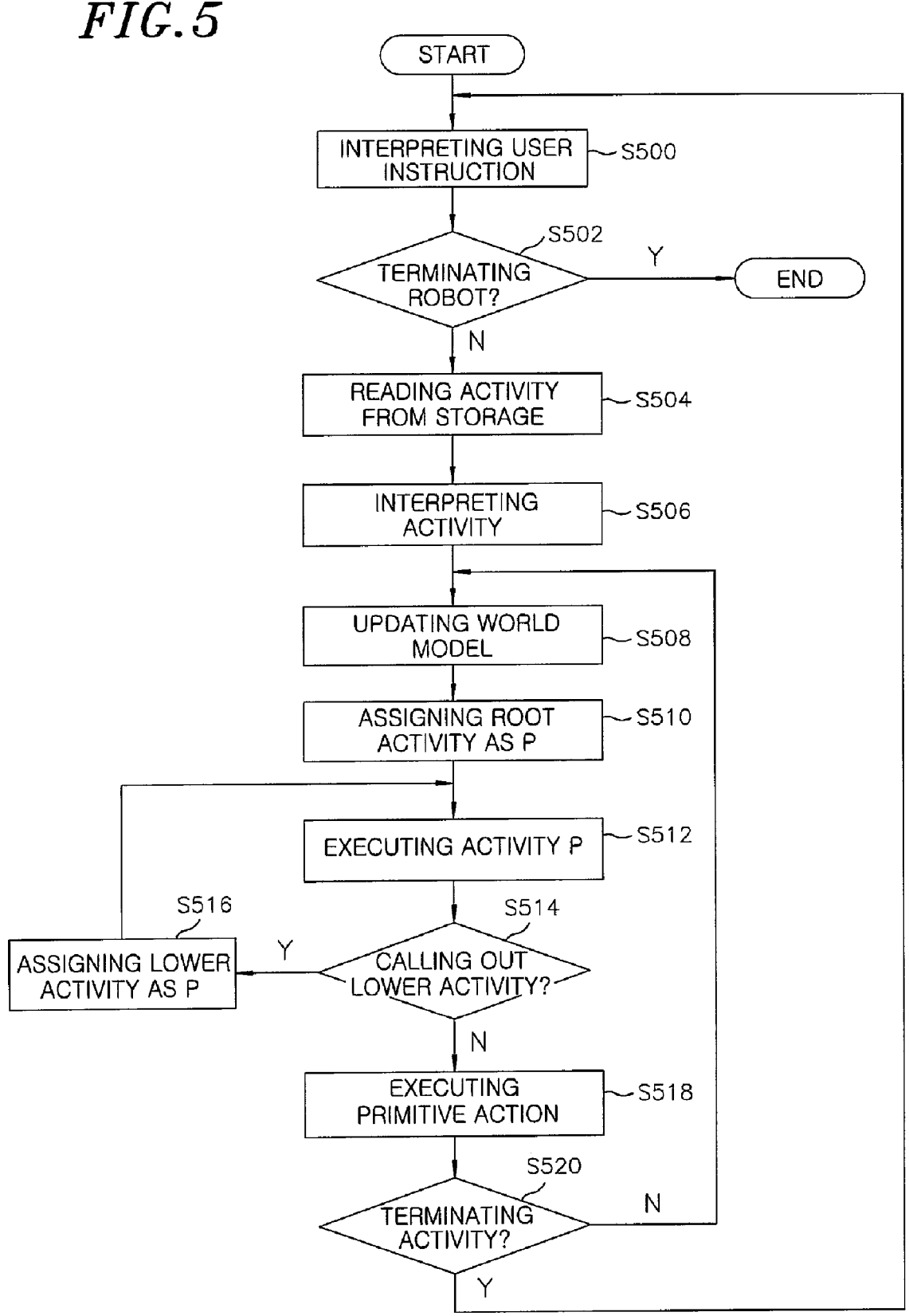
FIG. 5 illustrates a flowchart describing a procedure in which a robot moves based on an activity, in accordance with an embodiment of the present invention.

FIG. 5 illustrates a flowchart describing a procedure in which a robot acts based on an activity, in accordance with an embodiment of the present invention.

First, as shown in FIG. 5, in a stand-by mode where the robot 100 waits for a user's execution instruction, when the execution instruction is entered, the robot 100 interprets the execution instruction by the instruction interpreter 200 in step S500.

Figure 7:
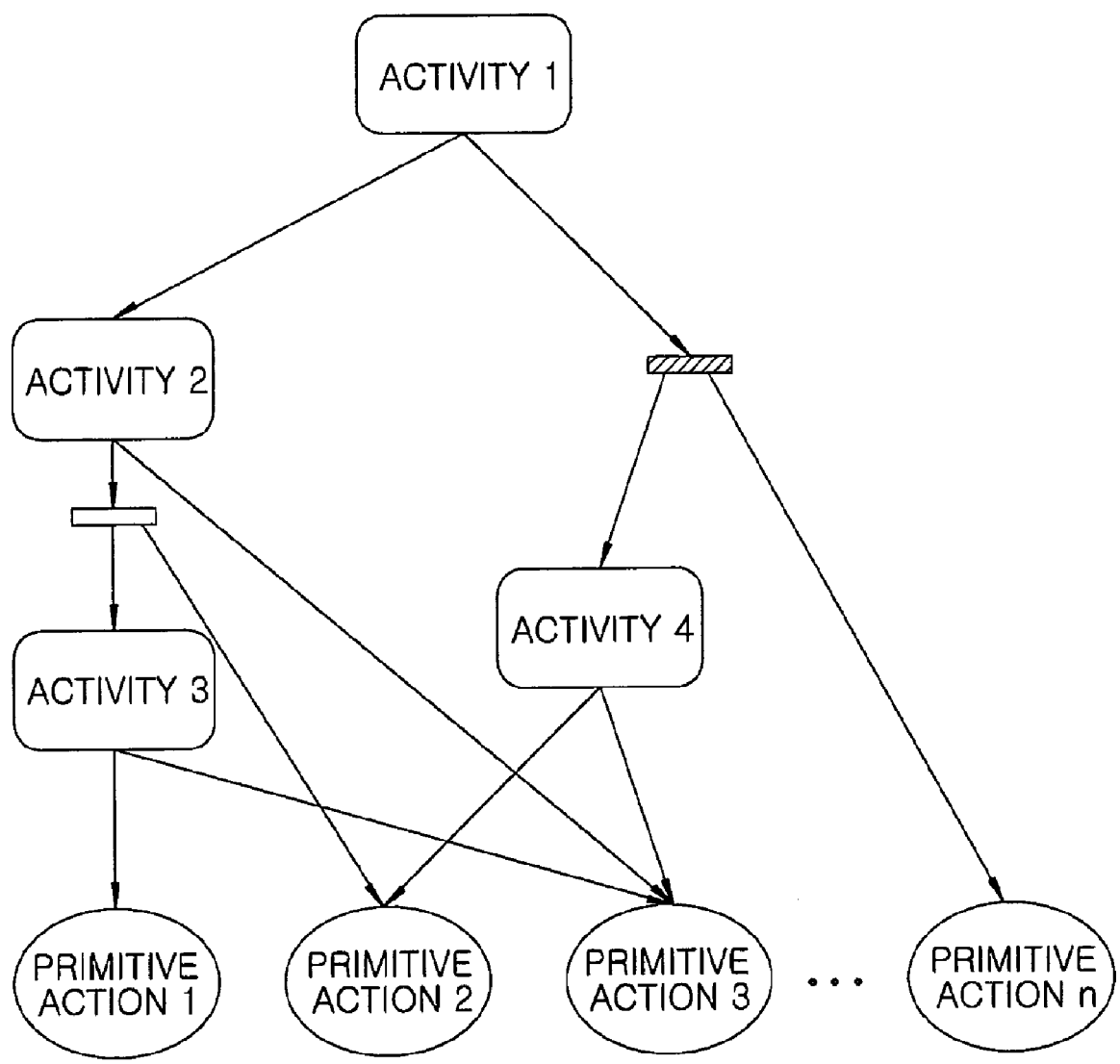
FIG. 7 presents one example of an activity tree.

In step S502, if the execution instruction interpreted in step S500 is to shut down the robot 100, the robot shuts down. If not, in step S504, the robot 100 reads an activity that is relevant to the execution instruction from the activity storage 210 by the activity manager 202. In this connection, the activity manager 202 reads, out of the activity storage 210, not only the relevant activity to the execution instruction, but also an activity tree, as shown in FIG. 7, that contains all child activities called out by the relevant activity, and provides the activity tree to the activity interpreter 204.

Next, in step S506, the activity interpreter 204 interprets the activity tree in a format readable by the activity executor 206, and provides the interpreted activity tree to the activity executor 206. The activity executor 206 then loads the interpreted activity tree by the activity interpreter 204 on the memory device.

Thereafter, in order for the activity executor 206 to execute the interpreted activity, in step S508, the robot 100 updates the world model 208 to reflect any changes in the surrounding conditions. That is, the changes in the surrounding conditions are derived from all kinds of built-in sensors mounted on the robot 100, adapted in a form required for the activity, and then stored in the world model 208.

After updating the world model 208, the activity executor 206 sets a root activity of the activity tree as an execution activity P in step S510, and carries out the execution activity P in step S512. Execution of the activity eventually calls out the other child activity, namely, a lower activity, or calls out primitive actions that are basically loaded on the robot 100. In step S514, if a child activity is called out by the activity executor 206, the child activity is assigned as the execution activity P in step S516, followed by returning to step S512 for execution of next steps. In other words, the child activity, which is a lower activity and is called out, calls out the other child activity thereof, or calls out any of primitive actions of the robot 100. Whether to call out a child activity or a primitive action depends on the modes of the activity. Because every mode in its activated status has mode actions to be executed, either a child activity or a primitive action may be called out based on what is described in the mode actions of an activated activity.

Meanwhile, if a lower activity is not called out to be executed, the activity executor 206 calls out and executes a primitive action in step S518, and decides whether the activity has finished in step 520.

If the decision result in step S520 shows that the activity has finished, the control process returns to the step S500 to receive a new user instruction, but if not, the control process returns to the step S508 to carry out subsequent steps. That is to say, from the step S508 for updating the world model 208 till all the execution of all primitive action constitutes a basic cycle of the execution of the activity tree. Such cycle repeatedly occurs until the execution of the activity tree is terminated.

Figure 6:
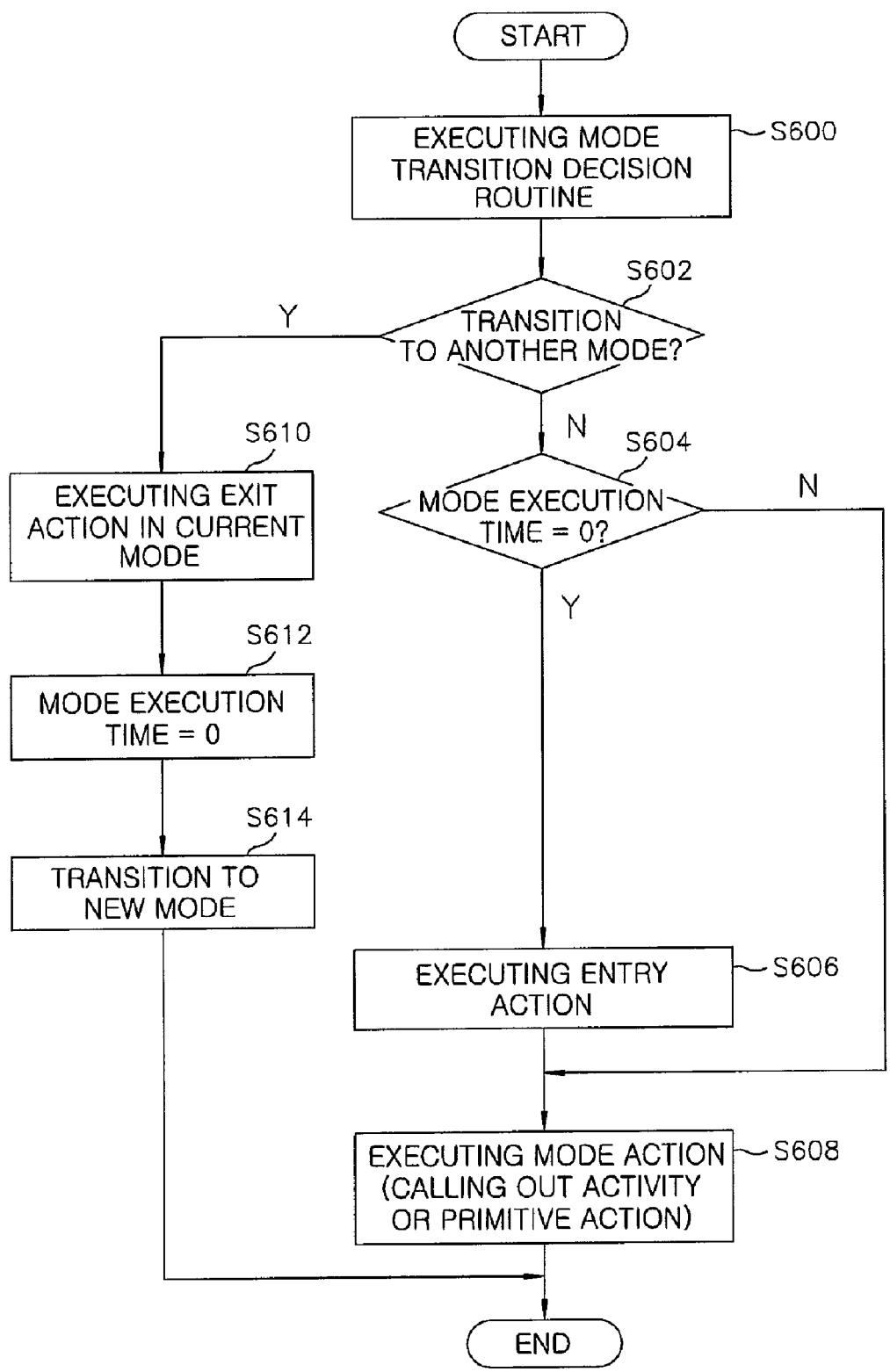
FIG. 6 illustrates a flowchart describing an execution process of a currently activated mode within an activated activity.

FIG. 6 illustrates a flowchart describing an execution process of a currently activated mode within an activated activity.

When a robot enters the currently activated mode, a mode transition decision routine of this mode is first called out and executed in step S600. Then, in step S602, the mode transition decision routine decides whether the current mode should be kept or whether the mode should transit to the other mode of the activity to which the current mode belongs, based on the surrounding conditions recorded on the world model 208.

In result of the decision made in step S602, if the current mode is to be kept, mode execution time of the current mode is checked in step S604. In result of the checking in step S604, if the mode execution time is "0" (representing that the current mode is a non-activated mode), it means that the current mode was not activated in a previous execution cycle but is newly activated in this cycle. Therefore, an entry action is executed while entering a new mode in step S606, and a mode action is executed in step S608. The mode action in step S708 refers to an action, which is to be run while the current mode is being activated, such as, calling out an activity or primitive action.

However, if the checking result in step S604 shows that the mode execution time is not "0" (representing that the current mode is an activated mode), which means that the mode execution time has set, the control process proceeds directly to step S608 to execute the current mode action.

Meanwhile, if the decision result in step S602 indicates that the current mode needs to transit to another mode according to the mode transition decision routine, in step S610 the control process executes an exit action of the current mode and, in step S612, initializes the mode execution time to 0. Thereafter, the current mode shifts to a new mode in step S614.

Since the entry action is executed when a robot enters the new mode, namely, when the current mode has not been activated in a previous execution cycle, a rule is established that, in the entry action, the robot should execute an action to meet a condition that has to be satisfied when the robot enters this mode. At this time, the action to be executed is an activity or primitive action.

Meanwhile, the exit action is performed once when the current mode activated transits to the other mode. Therefore, the exit action describes actions about how the robot 100 can perform a cleaning work such as cancellation of secured resources in this mode. Similar to the entry action, an activity or basic action can be the exit action.

FIG. 7 shows an example of forming an activity tree associated with different activities or primitive actions.

In FIG. 7, ACTIVITY 1 becomes a root activity of the activity tree, and it is the only root in the activity tree. AVTIVITY 1 describes that a certain mode in the ACTIVITY 1 calls out ACTIVITY 2 as the mode action, and the other mode executes both ACTIVITY 4 and PRIMITIVE ACTION N concurrently as the mode action. This implies that, only if both ACTIVITY 4 and PRIMITIVE ACTION N are completed, the mode action that called out those two concurrently is regarded as being ended. Further, ACTIVITY 2 permits to carry out ACTIVITY 3 and PRIMITIVE ACTION 2 concurrently, or carry out PRIMITIVE ACTION 3, depending on activated modes in ACTIVITY 2. This implies that although ACTIVITY 3 and PRIMITIVE ACTION 2 are performed at the same time, if execution of one of these two is completed first, the other is interrupted and then the mode action is regarded as being ended.

As noted earlier, in the activity tree, activities are continuously connected and called out till terminal nodes at which primitive actions of a robot are positioned. Only primitive actions of the robot 100 can be the terminal nodes, while only activity nodes can be intermediate nodes. Therefore, a user can select a desired activity out of such an activity tree and instruct the robot to execute the selected activity.

In accordance with the present invention, by creating not only a simple, execution procedure of primitive action but also a complex action execution procedure, it becomes possible to easily create planar/sequential simple action execution programs for a robot as well as hierarchical/parallel complex action execution programs for a robot.

In addition, unlike the conventional approaches, the present invention also covers hierarchical/parallel action selection procedures, so that it can give a more natural expression upon decision of robot action.

While the invention has been shown and described with respect to the preferred embodiments, it will be understood by those skilled in the art that various changes and modification may be made without departing from the scope of the invention as defined in the following claims.

What is claimed is:

1. A network-based robot system comprising:
an activity creating device creating activities in hierarchical structure, each activity describing action execution procedures to be carried out and being arranged in an activity tree;
a robot downloading the activity tree over a communication network and executing an activity selected in the activity tree,
wherein the robot comprises:
an activity storage storing the activity trees provided through the communication network;
an activity manager searching for, in response to an activity execution instruction, an activity tree having an activity corresponding to the execution instruction from the activity storage;
an activity interpreter interpreting the activity tree searched by the activity manager;
an activity executor selectively executing activities in the interpreted activity tree; and
a plurality of primitive actions to be taken by the robot.

2. The network-based robot system of claim 1, wherein the activity is comprised of plural modes, each mode representing what action of the robot is taken by the activity at a moment, the activity including:
start mode starting when the activity is executed;
goal mode being reached when a predetermined goal has finished by an execution of the activity; and
history storing previous execution records of the activity,
wherein each of the modes includes a mode transition decision routine for the transition decision of the mode, a mode execution time, an entry action at the mode execution time, an exit action for the mode transition, and a mode action for executing the mode.

3. The network-based robot system of claim 2, wherein each of the entry action, the exit action, and the mode action is expressed in a manner that the action is completed when a plurality of activities or primitive actions is executed concurrently and are all finished.

4. The network-based robot system of claim 2, wherein each of the entry action, the exit action, and the mode action is expressed in a manner that the action is completed when one of activities or primitive actions is finished.

5. The network-based robot system of claim 2, wherein each of the entry action, the exit action, and the mode action is expressed in a manner that a single activity is executed when the action executes one single action.

6. The network-based robot system of claim 2, wherein each of the entry action, the exit action, and the mode action is expressed in a manner that a single primitive action is executed when the action executes one single action.

7. The network-based robot system of claim 2, wherein the start mode is executed depending on execution records in the history.

8. The network-base robot system of claim 2, wherein the robot further comprises:
one or more sensors mounted on the robot collecting surrounding conditions of the robot at a predetermined time interval; and
a world model storing the surrounding conditions to reflect changes in the surrounding conditions,
wherein the activity executor decides whether the mode in the activity should transit based on the world model, when the mode in the activity is executed.

9. The network-based robot system of claim 2, wherein the activity executor calls out a child activity in the activity tree or the primitive action when the activity is executed.

10. A method for action execution of a robot in a network-based robot system, comprising:
creating activities in hierarchical structure, each activity describing action execution procedures to be run by the robot and being arranged in an activity tree;
downloading the activity tree via communication network to storing the activity tree in the robot:
searching for, in response an execution instruction of the robot, the activity tree including a target activity corresponding to the execution instruction;
interpreting the searched activity tree; and
executing the target activity in the interpreted activity tree,
wherein executing the target activity includes:
setting a root activity in the activity tree as an execution activity;
executing the execution activity;
if the execution activity calls out a lower activity in the activity tree when it is executed, setting the called lower activity as the execution activity to execute the execution activity; and if the lower activity is not called out, executing a preset primitive action to be taken primitively by the robot.

11. The method of claim 10, wherein the activity is comprised of plural modes, each mode representing what action is taken by the activity; and wherein executing the execution activity executes the modes within the execution activity.

12. The method of claim 11, further comprising:

updating changes in surrounding conditions of the robot;

deciding whether a current mode taken by the execution activity needs to transit any of the modes when the execution activity enters the current mode based on surrounding conditions;

deciding whether the current mode has been an activated mode in a previous execution if the current mode does not need the mode transition;

executing entry action within the current mode and then mode action if the current mode is a non-activated mode in the previous execution;

executing mode action within the current mode and the primitive action if the current mode is an activated mode; and executing exit action within the current mode and transiting the current mode to any of the modes if the current mode needs the mode transition.

13. The method of claim 12, wherein deciding whether the current mode has been an activated mode is performed based on mode execution time set within the current mode.

14. The method of claim 12, wherein transiting the mode to any of the modes includes initializing mode execution time within the current mode and then transiting the current mode to any of the modes.

* * * * *